United States Patent

Vroman

[11] 4,020,539
[45] May 3, 1977

[54] CATALYTIC REACTOR FOR AUTOMOBILE

[75] Inventor: William R. Vroman, Madison Heights, Mich.

[73] Assignee: Chrysler Corporation, Highland Park, Mich.

[22] Filed: Mar. 24, 1975

[21] Appl. No.: 561,528

Related U.S. Application Data

[63] Continuation-in-part of Ser. No. 342,575, March 19, 1973, abandoned.

[52] U.S. Cl. .............. 29/157 R; 29/455 R; 29/463; 23/288 FC; 60/299
[51] Int. Cl.² ............. B23P 15/00; B01J 8/06
[58] Field of Search .......... 29/157 R, 455, 463, 29/469; 23/288 FC; 138/148, 149; 252/477 R; 60/299

[56] References Cited

UNITED STATES PATENTS

| | | | |
|---|---|---|---|
| 3,562,895 | 2/1971 | Niebergall et al. | 29/455 |
| 3,692,497 | 9/1972 | Keith et al. | 60/299 |
| 3,798,006 | 3/1974 | Balluff | 23/288 FC |
| 3,852,041 | 12/1974 | Moore et al. | 60/299 |
| 3,854,888 | 12/1974 | Frietzsche et al. | 23/288 FC |
| 3,912,459 | 10/1975 | Kearsley | 23/288 FC |

*Primary Examiner*—C.W. Lanham
*Assistant Examiner*—Daniel C. Crane
*Attorney, Agent, or Firm*—Talburtt & Baldwin

[57] ABSTRACT

A catalytic reactor of oval cross section comprises a generally cylindrical catalytic substrate clamped between paired housing shells and spaced therefrom by a mesh support that extends around the oval periphery of the substrate and slightly overlaps the latter's axially opposite ends to provide locating projections. The support and housing are preferably interlocked by one or more pairs of inwardly opening channels of the housing having portions of the mesh support confined therein, each pair being spaced axially by a rib of the housing projecting into the mesh support. The housing has axially endwise converging cam portions adjacent and axially endwise of the opposite ends of the substrate to engage the locating projections and center the assembled substrate and mesh support within the housing during manufacture of the reactor.

11 Claims, 2 Drawing Figures

CATALYTIC REACTOR FOR AUTOMOBILE

BACKGROUND AND SUMMARY OF THE INVENTION

This application is a continuation-in-part of copending application Ser. No. 342,575, filed Mar. 19, 1973, now abandoned, and relates to improvements in a catalytic reactor for automobile engine exhaust wherein a monolithic substrate treated with a catalyst is confined within a housing.

In such constructions, the substrate comprises a porous ceramic core treated with a catalyst for expediting the reaction of certain components in the exhaust gas flowing axially through the core. Because of the comparatively intense heat of the reaction and the constant and often severe vibration of the reactor resulting from gas pulsation and road shock, difficulty has been experienced in supporting the core to prevent its disintegration after a short interval of operation. Attempts heretofore to grip the substrate firmly within the housing have invariably resulted in excessive frictional wear of the substrate at the location of the gripping elements. A resilient steel mesh sleeve or blanket around the substrate to support the same has been proposed by Keith et al, U.S. Pat. Nos. 3,441,387 and 3,692,497, and Balluff, Pat. No. 3,798,006, but attempts to provide such a support heretofore have been costly and have not adequately supported the substrate after the resiliency of the steel wire or fibers in the mesh was impaired by the operational heat of the reactor.

It has also been deemed necessary to support the substrate by endwise force and locating means intended to locate the substrate in predetermined axial relationship within the housing and to prevent axial shifting and damage to the substrate. In such structures, the supporting force must clamp the substrate with sufficient firmness to withstand road shock and pulsating exhaust gas pressures during operation, but must be distributed over an appreciable endwise area of the substrate in order to prevent excessive localized pressure that would otherwise crush the substrate. As a result a large portion of the effective cross sectional area of the costly substrate is rendered useless for gas flow therethrough.

It is accordingly an important object of the present invention to provide an improved reactor and method of manufacturing the same wherein a monolithic substrate is supported in spaced relationship with respect to the housing at all locations by means of a compacted resilient wire mesh clamped between a pair of housing shells arranged to exert a clamping force directed toward the outer peripheral surface of the substrate around the gas flow therethrough. The substrate and housing are preferably of oval cross section transverse to the direction of gas flow and the housing shell sections are clamped together by force directed transversely of the latter direction and also transversely of the longer axis of the oval section to permit exposure of the maximum surface area of the substrate to the clamping force, thereby to eliminate the need for any endwise clamping force.

The mesh support is preferably formed from several layers of knitted resilient stainless steel wire to comprise a matrix that is subsequently compacted between the assembled substrate and housing. The housing is preferably formed from sheet steel reinforced by a pair of inwardly projecting ribs or projections formed therein to extend around the oval periphery of the support and to effect an interference fit within the mesh support when the two housing shells are assembled around the substrate and forced together to clamp the mesh between the substrate and housing. Also the housing shells are preferably formed with a pair of inwardly opening channels associated with each rib and spaced axially thereby to receive portions of the mesh compacted therein and displaced by the ribs when the housing shells are assembled and pressed against the substrate, thereby to interlock the mesh support with the otherwise comparatively smooth interior of the housing.

In consequence of the above described structure, a positive interlock is provided between the housing and mesh to prevent relative movement therebetween in any direction. The substrate has a high friction coefficient, so that the resilient wire mesh matrix compacted against the substrate as described herein positively prevents relative movement with respect to the substrate and also effects a high resistance to gas flow that would otherwise readily bypass the catalyst and substrate in the space between the latter and housing. Thus, the optimum total clamping force distributed over the entire outer periphery of the substrate in accordance with the present invention minimizes localized clamping forces without sacrificing the support for the substrate required to prevent relative movement between the substrate and housing.

Another object is to provide such a reactor wherein the mesh support is provided with endwise locating projections that extend axially endwise in opposite directions beyond the substrate to engage mesh locating portions of the housing, which may comprise endwise converging cams, thereby to provide means for properly locating the substrate with respect to the housing during assembly of the reactor. Thus during manufacture of the reactor, a subassembly of the substrate and mesh support is first provided by wrapping the support tightly around the substrate centered within the support and securing the support in the wrapped-around condition with its locating projections extending endwise in axially opposite directions from the substrate.

Inasmuch as the support, substrate, and housing may be fabricated independently at different locations, the present invention enables the subassembly to be accomplished by or near the fabricator of the substrate, such that handling of the unprotected brittle substrate and possible damage thereto is minimized. After the subassembly of the substrate with the support as described above, the support with its axially extending locating projections protects the substrate during subsequent handling and shipping, as for example to the fabricator of the housing where heavy equipment and expertise for clamping and welding are available.

To complete the reactor, the subassembly is located within one of the housing shells at a position centered generally between the latter's cams, which by engagement with the locating projections then cam the subassembly axially to its desired position with respect to the housing shell. The second housing shell is then located against the subassembly such that the cams or mesh locating portions of the second housing shell cam the latter to its desired position with respect to the first shell. The two housing shells are then clamped tightly together and secured to each other in the clamped condition to complete the assembly.

The locating projections of the mesh are employed merely to locate the support with respect to the housing during manufacture. They do not serve as axial clamping members and need not even contact the mesh locating portions of the housing after assembly, nor do they interfere with axial gas flow through the substrate by overlapping any axial end portion of the latter. However, in cooperation with the circumferential clamping and interlocking between the housing and mesh support described herein, they do permit elimination of axial clamping means employed heretofore for the purpose of locating and holding the substrate properly with respect to the housing.

Other objects of this invention will appear in the following description and appended claims, reference being had to the accompanying drawings forming a part of this specification wherein like reference characters designate corresponding parts in the several views.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 2:
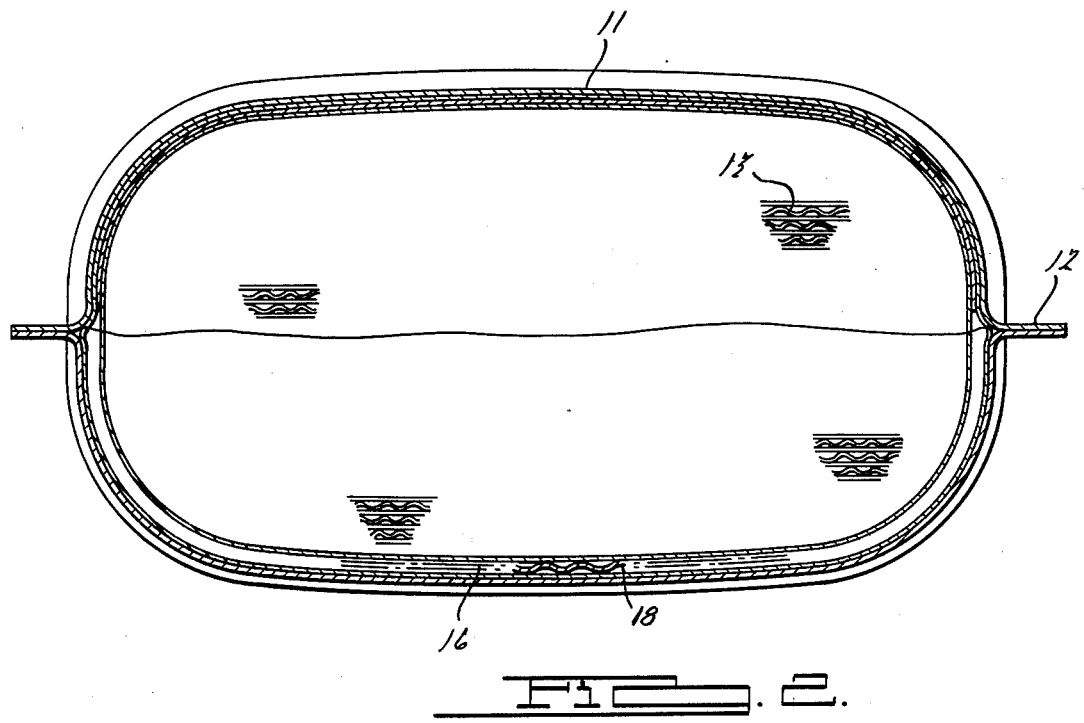
FIG. 2 is a transverse section taken in the direction of the arrows substantially along the broken line 2—2 of FIG. 1.

Referring to the drawings, a catalytic reactor 10 is illustrated comprising two sheet steel housing shells 11 flanged and welded securely together at a gas tight seal 12 along the mid-plane containing the major transverse axis of the generally oval or elliptical cross-sectional shape of the monolithic substrate 13 for a catalyst, FIG. 2. The housing 11 is provided with an inlet 14 and an outlet 15 for conducting exhaust gases axially to and from the substrate 13. In this regard, the reactor 10 may comprise a single catalytic substrate 13, or several similar substrates in series. Thus in the present instance the outlet 15 also comprises the inlet for a second monolithic substrate 13a which may be identical to the substrate 13.

Figure 1:
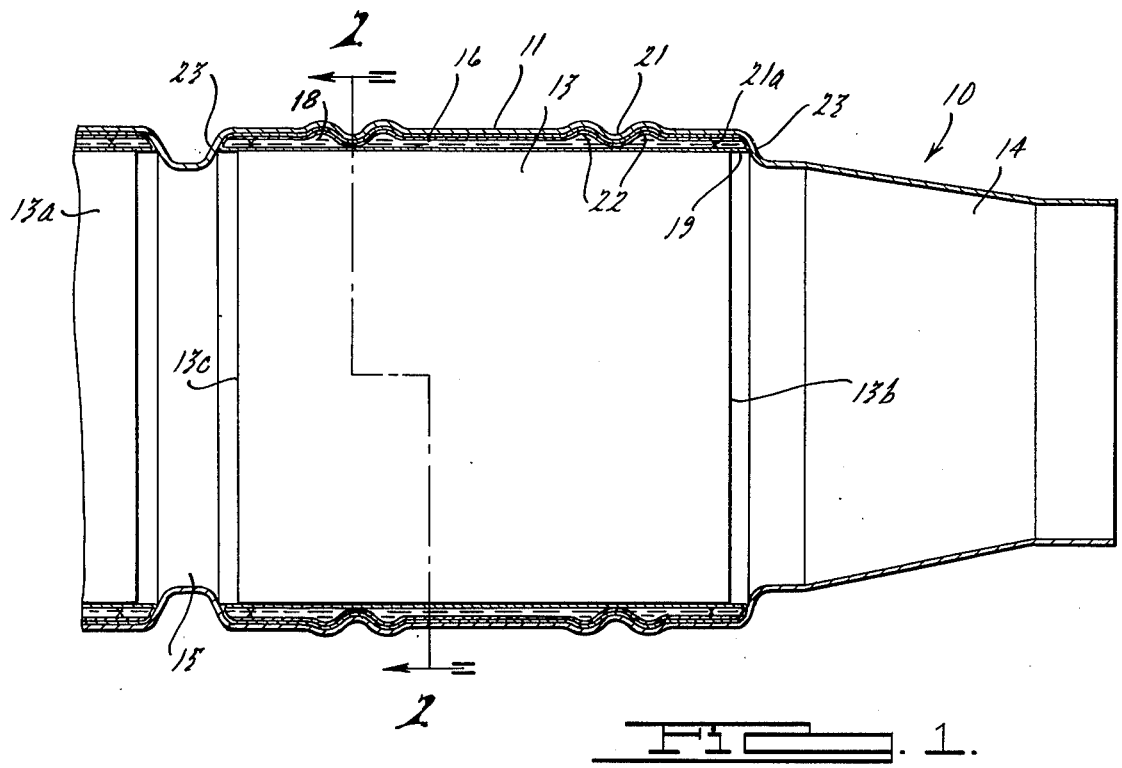
FIG. 1 is a longitudinal mid-section through a reactor embodying the present invention.

In the fabrication, the substrate 13 is extruded in a plastic condition to provide a porous cylindrical core or log, which is cut to suitable length to provide axially opposite plane end faces 13b and 13c through which the exhaust gases may flow axially i.e., from right to left in FIG. 1. The core or substrate 13 has a cross sectional shape transverse to the axial gas flow similar to the housing 11, but slightly smaller to provide a space 16 between the interior of the housing 11 and the oval periphery of the substrate 13 entirely around the latter periphery. Eventually the core 13 is treated with a suitable catalyst and cured to its final hardened condition for assembly in the reactor 10.

A mesh support 18 spaces the substrate 13 entirely from the interior of the housing 11 and also provides an effective resistance to gas flow in the space 16. Locating projections 19 of the mesh support 18 extend axially endwise beyond the axially opposite ends 13b and 13c of the substrate 13. Preferably the mesh 18, 19 is formed from multiple layers of knitted stainless steel wire to comprise a compact matrix. The steel wires or fibers in the matrix are selected to withstand the reactor operating temperatures and are preferably less than 0.01 inch diameter. A satisfactory mesh comprising 0.0045 inch diameter wire has been tested satisfactorily.

Each housing shell 11 is formed with a pair of inward projections or ribs 21 pressed into the underlying mesh support 18 at an interference fit to spread portions thereof axially into the space 16. Spaced axially by each projection 21 are two inwardly opening channels 22 of the housing shell 11 arranged to receive the axially displaced material of the mesh 18 snugly and to interlock therewith when the ribs 21 are forced into the mesh 18. The ribs or projections 21 and channels 22 of each housing shell 11 cooperate to reinforce the latter and prevent their being buckled out of shape by the clamping force, and also to extend entirely around the circumference of the substrate 13. In the assembled position, the mesh 18 interlocks the substrate 13 and housing 11 and positively prevents relative motion therebetween.

As illustrated, the mesh support 18 encloses the entire oval periphery of the substrate 13. The locating projections 19 protect the peripheral edges of the substrate 13 during handling prior to assembly within the housing shells 11. After assembly, the projections 19 lie between a pair of inwardly projecting mesh locating portions or cams 23 of the housing shells 11 which are co-extensive with the peripheral oval edges of the ends 13b and 13c and are spaced endwise therefrom. When the substrate 13 is centered within the mesh support 18 and the locating projections 19 are between the cams 23, the substrate 13 will also be properly located within the housing 11.

The outer ends of the projections 19 may be preformed and rounded as shown in FIG. 1, so as to conform to the shape of the adjacent inner surfaces of the cams 23, but the shape of these outer ends is not critical to the operation of the present invention because the projections 19 are provided only to facilitate assembly of the reactor, although they are rendered feasible and important as locating means because of the transverse clamping between the housing shells 11 and the consequent avoidance of axial clamping. Thus the ends of the projections 19 may terminate parallel to the substrate ends 13c and 13b and may or may not actually contact the cams 23 after the reactor 10 is assembled. It is only essential that the projections 19 extend slightly endwise of the substrate 13, as for example by several hundreths of an inch, i.e., approximately 0.08 inch in the present instance to assure suitable spacing between the housing and the peripheral edges of the substrate ends 13b and 13c when the projections 19 are confined axially between the mesh locating cams 23.

In assembly, after a suitable catalyst is applied to the substrate 13 and the latter is cured and hardened, the substrate 13 is placed centrally on a generally rectangular flat sheet or blanket of the mesh support 18 having the axial dimension of the sleeve 18 and having axially extending edges spaced by the dimension of the oval circumference of the substrate 13. The mesh support or blanket 18 is then wrapped tightly around the oval periphery of the substrate 13 with the locating projections 19 extending in axially opposite directions from the ends 13c and 13b as shown, until the aforesaid axially extending edges of the blanket 18 are brought into juxtaposition with each other. These latter edges are then suitably secured together, as for example by spot welding or by stainless steel stitches or staples at 21a to complete a subassembly of the substrate 13 and mesh support 18. Thereafter, before the housing shells 11 are assembled together, a separate subassembly 13, 18 is placed within one of the housing shells centrally between its pair of the cams 23. The latter compensate for minor misalignment and guide the subassembly into the desired location within the one housing shell. In this regard, the projections 19 are sufficiently short and stiff so that they do not bend inwardly across the end surfaces 13b and 13c.

The other housing shell 11 is then assembled with the one shell 11 substantially as illustrated and the locating projections 19 cooperable with the cams 23 guide the other shell 11 to its desired position with respect to the subassembly and the one housing shell 11.

The two housing shells are then clamped tightly together by force directed normally to the plane of the flanges 12, i.e. transversely to the long axis of the oval section to compact the mesh support 18 against the oval surface of the substrate 13 and positively secure the latter by frictional force against movement in any direction with respect to the mesh 18. In the same clamping operation, the ribs 21 are embedded into the mesh 18 and portions of the latter are forced into the grooves 22 to effect a positive interlock between the mesh 18 and housing 11. Thus, by virtue of the powerful total clamping force exerted by the housing shells 11 over the comparatively large circumferential oval area of the substrate 13, and without recourse to axial endwise clamping, the completed assembly illustrated readily withstands the vibrational and pulsating loads to which it is subjected.

Excessive localized compressional forces that would otherwise tend to crush the substrate 13 are further minimized by reason of the oval cross section. In this regard the total clamping force against the mesh 18 and underlying substrate 13 is distributed over the broad surface area of the substrate parallel to the long axis, i.e., over the upper and lower generally horizontal surfaces in FIG. 1 to effect a comparatively small crushing force per unit of area.

Preferably assembly of the one housing shell 11 and subassembly 13, 18 is assisted by gravity, such that one housing shell 11 is located in an upwardly opening position, the subassembly 13, 18 is lowered into it, and the other housing shell 11 is then lowered over the subassembly 13, 18. However, the shell sections 11 may be pushed against the subassembly 13, 18 arranged at any angle. The cam action between the cams 23 and projections 19 to correct slight misalignment will be the same in any event.

I claim:

1. In the method of making a catalytic reactor comprising a catalyst treated substrate adapted for axial gas flow therethrough and having an outer peripheral surface around said gas flow and supported within a housing enclosing and spaced from said surface by a compacted fibrous mesh support, said housing having a pair of axially spaced peripheral inwardly extending mesh locating portions spaced axially endwise from the axially opposite ends and peripheral edges of said substrate, said mesh support having locating projections extending endwise of said axially opposite peripheral edges and confined axially between said pair of mesh locating portions, the steps of providing said housing in separate sections extending longitudinally of said axial gas flow, providing a subassembly comprising said mesh support confined tightly around said peripheral surface of said substrate with said locating projections of said support extending endwise from said axially opposite peripheral edges, arranging said subassembly withhin said housing sections with the locating projections of said support confined axially between said mesh locating portions of said housing spaced axially endwise from said ends sufficiently to avoid clamping said projections around said peripheral edges when said housing sections are clamped and secured together, thereafter clamping said separate housing sections toward said surface with sufficient force transverse to the axis of said gas flow to frictionally hold said housing, mesh support, and substrate together as a unit to prevent the transmission of axial force from said mesh locating portions to the axially opposite ends of said substrate without recourse to auxiliary axial support or other forces for preventing relative axial shifting of said substrate with respect to said mesh support and housing, and thereafter securing said housing sections together while maintaining said transverse force thereon.

2. In the method of claim 1, forming said housing sections to provide a rib for embedding into said mesh support around said gas flow when said housing sections are clamped together.

3. In the method of claim 2, forming said housing sections to provide an inwardly opening channel adjacent said rib to receive portions of the mesh of said support compacted therein.

4. In the method of claim 1, forming said substrate and housing with elongated cross sections transverse to said axial gas flow, forming said housing sections to provide two separate shell sections having edges adapted to be clamped and secured together adjacent the opposite ends of the elongated dimension of said cross section, and clamping said mesh support between said housing and surface by clamping said edges of said shell sections together with said force directed against said surface transversely to said elongated dimension.

5. In the method of claim 4, forming said shell sections to provide an inwardly projecting reinforcing rib for embedding into said mesh support at locations around said gas flow when said edges of said shell sections are clamped and secured together.

6. In the method of claim 5, forming said shell sections to provide a pair of inwardly opening channels associated with said rib and spaced thereby to receive portions of the mesh of said support compacted therein adjacent the rib.

7. In the method according to claim 4, forming each of said shell sections with part of said mesh locating portions, locating said subassembly within one of said shell sections with the locating projections of said support confined axially between the mesh locating portions of the one shell section, thereafter locating the other of said shell sections with its mesh locating portions confining the locating projections of said support axially therebetween and with said edges of said shell sections in juxtaposition for being clamped together.

8. In the method according to claim 7, forming at least one of the axially spaced mesh locating portions to provide an axially endwise inclined cam engageable with one of said axially extending locating projections of said support during said arranging for camming said subassembly and housing shells axially into predetermined relationship with said subassembly confined between said mesh locating portions, said arranging comprising camming said subassembly and shell sections into said predetermined relationship by engagement between said inclined cam and adjacent locating projection.

9. In the method according to claim 8, said arranging comprising locating said one shell section in an upwardly opening position, lowering said subassembly into the upward opening of said one shell section, thereafter lowering the other shell section in a downwardly opening position over said subassembly.

10. In the method according to claim 7, said arranging comrising locating said one shell section in an upwardly opening position, lowering said subassembly into the upward opening of said one shell section, thereafter lowering the other shell section in a downwardly opening position over said subassembly.

11. In the method according to claim 1, the step of providing said housing comprising the formation of at least one of said inwardly extending mesh locating portions to provide an axially endwise inclined cam engageable during said arranging with one of said axially extending locating projections of said support for camming said subassembly and housing axially into predetermined relationship with said subassembly confined between said mesh locating portions, and the arranging of said subassembly within said housing sections comprising camming said subassembly and housing sections into said predetermined relationship by engagement between said inclined cam and adjacent locating projection of said mesh support.

* * * * *